United States Patent
Park et al.

(10) Patent No.: US 7,213,251 B2
(45) Date of Patent: May 1, 2007

(54) GUIDE SHAFT TILT ADJUSTING APPARATUS FOR OPTICAL DISC PLAYER

(75) Inventors: Chan-bum Park, Seoul (KR); Jueng-rak Lee, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 611 days.

(21) Appl. No.: 10/609,573

(22) Filed: Jul. 1, 2003

(65) Prior Publication Data

US 2004/0028394 A1 Feb. 12, 2004

(30) Foreign Application Priority Data

Aug. 7, 2002 (KR) .......................... 2002-0046557

(51) Int. Cl.
*G11B 7/09* (2006.01)
(52) U.S. Cl. ...................................... 720/675; 720/671
(58) Field of Classification Search ................ 720/675, 720/674, 676
See application file for complete search history.

(56) References Cited

U.S. PATENT DOCUMENTS

| | | | |
|---|---|---|---|
| 6,385,160 B1 * | 5/2002 | Jeon | 720/675 |
| 6,683,842 B2 * | 1/2004 | Ko | 720/675 |
| 6,874,154 B2 * | 3/2005 | Inoue et al. | 720/675 |

* cited by examiner

*Primary Examiner*—Andrea Wellington
*Assistant Examiner*—Peter Vincent Agustin
(74) *Attorney, Agent, or Firm*—Staas & Halsey LLP

(57) ABSTRACT

A tilt adjusting apparatus for an optical disc player to adjust a tilt of an optical pickup having adjusting ends positioned on at least first ends of two guide shafts that guide reciprocating motion of the optical pickup, elastic members positioned below the adjusting ends to bias the adjusting ends in a first direction, stoppers positioned on brackets above the adjusting end, to limit adjustment of the adjusting ends in the first direction, and adjusting screws coupled to the stoppers, to adjust the adjusting ends in a second direction opposite the first direction, thereby adjusting the inclination of the guide shafts. The stoppers are sized so that the optical pickup does not contact a lower surface of the disc even during large inclinations of the guide shaft.

35 Claims, 8 Drawing Sheets

US 7,213,251 B2

GUIDE SHAFT TILT ADJUSTING APPARATUS FOR OPTICAL DISC PLAYER

CROSS-REFERENCE TO RELATED APPLICATIONS

This application claims the priority of Korean Patent Application No. 2002-46557, filed on Aug. 7, 2002, in the Korean Intellectual Property Office, the disclosure of which is incorporated herein by reference.

BACKGROUND OF THE INVENTION

1. Field of the Invention

The present invention relates to an optical disc player, and more particularly, to a tilt adjusting apparatus to adjust a tilt of an optical pickup so that a light beam emitted from the optical pickup is perpendicularly incident on a recording surface of a disc.

2. Description of the Related Art

Generally, an optical disc player records data or reproduces recorded data by irradiating a light beam on an optical recording medium such as a compact disc (CD) or a digital video disc (DVD). To perform the above job, the optical disc player includes a turntable on which a disc is laid, a spindle motor for rotating the turntable, and the optical pickup that performs recording and reproduction of data by irradiating the light beam on the recording surface of the disc.

In such an optical disc player, the light beam emitted from the optical pickup is required to be perpendicularly incident on the recording surface of the disc, to form a spot of the light beam of a correct focus. But due to manufacturing and assembly problems, it is difficult to keep the disc parallel to a main base provided with a guide shaft for guiding the transfer motion of the optical pickup or the spindle motor for supporting and rotating the disc. Since a distance between the disc and the optical pickup changes depending on the movement of the optical pickup, the incident direction of the light beam is not accurately perpendicular to the recording surface of the disc. As described above, if the incident direction of the light beam deviates, the correct spot of the light beam cannot be formed on the recording surface of the disc, and errors may be generated in recording or reproducing data. Thus, the light beam can be made perpendicularly incident on the recording surface of the disc by keeping the disc and the optical pickup parallel to each other, to form a correctly focused spot of the light beam. This is referred to as a tilt adjustment or a skew adjustment.

FIG. 1 shows a main base of an optical disc player with a conventional tilt adjusting apparatus.

As shown in FIG. 1, the optical disc player includes a spindle motor 20 for rotating a disc (not shown), and an optical pickup 30 that performs recording and reproduction of data by irradiating a light beam on a recording surface of the disc. A turntable 22 to accommodate the disc is positioned on an upper portion of the spindle motor 20. The optical pickup 30 includes various optical components such as a pickup base 34 and an objective lens 32 mounted on the pickup base 34. The spindle motor 20 and the optical pickup 30 are assembled onto a main base 10. The main base 10 is installed in a disc tray of the optical disc player or a main frame of a housing. The main base 10 is provided with an opening 12, in which to move the optical pickup 30.

The optical pickup 30 moves along a radial direction of the disc, and irradiates the light beam on the recording surface of the disc. To move the optical pickup 30, the main base 10 is provided with an optical pickup transfer unit 40.

The optical pickup transfer unit 40 includes a lead screw 46 to linearly move the optical pickup 30 by its rotation, a driving motor 42, and a connection gear group 44 to transmit power from the driving motor 42 to the lead screw 46. Two guide shafts 51 and 52 are positioned at opposing sides of the optical pickup 30 to guide the reciprocating linear movement of the optical pickup 30.

The main base 10 is provided with a tilt adjusting apparatus for adjusting the tilt of the optical pickup 30. The tilt adjusting apparatus adjusts a distance between the recording surface of the disc and the optical pickup 30 by adjusting the inclinations of the two guide shafts 51 and 52 using two adjusting screws 61 and 62 and two leaf springs, respectively.

FIG. 2 is a cross-sectional view showing a structure incorporating the guide shaft with the tilt adjusting apparatus of FIG. 1, and FIG. 3 is a cross-sectional view to explain problems of the conventional tilt adjusting apparatus generated when the guide shafts 51 and 52 shown in FIG. 2 are over-adjusted. Since the above incorporating structure is the same at both guide shafts 51 and 52, only the incorporating structure of one guide shaft 51 will be described.

Referring now to FIG. 2, an end of the guide shaft 51 closest to the spindle motor 20, a supporting end 51a, is positioned inside the circumference of the disc D, and is inserted into and supported by a supporting groove 14 in the main base 10. Since the supporting groove 14 prevents the supporting end 51a from moving up and down, the supporting end 51a functions as a hinge point when an adjusting end 51b of the guide shaft 51 moves up and down.

The adjusting end 51b of the guide shaft 51 is movably supported by the adjusting screw 61 and the leaf spring 71. The adjusting screw 61 is coupled with a bracket 16 installed at the main base 10, and the lower portion of the adjusting screw 61 contacts an upper surface of the adjusting end 51b of the guide shaft 51. The bracket 16 may be manufactured as part of the main base 10 using standard injection mold technology. In recent optical disk drives, however, the bracket 16 is made of a metallic plate having a thickness of 0.8–1.0 mm, which is incorporated into the main base 10.

A first end of the leaf spring 71 is fixed to a lower surface of the main base 10 by a locking screw 73. A second end of the leaf spring 71 contacts a lower surface of the adjusting end 51b of the guide shaft 51 and applies an elastic force upward. Since the adjusting end 51b of the guide shaft 51 moves up and down by tightening or loosing the adjusting screw 61, the inclination of the guide shaft 51, and thereby the tilt of the optical pickup 30 guided by the guide shaft 51, is adjusted.

In the conventional tilt adjusting apparatus, as shown in FIG. 3, the inclination of the guide shaft 51 can be adjusted until an edge of the adjusting end 51b contacts the lower surface of the bracket 16. However, the guide shaft 51 may incline too much, and the optical pickup 30, guided by the guide shaft 51, may contact the lower surface of the disc D. Furthermore, when the bracket 16 coupled with the adjusting screw 61 is made of a thin metal plate as described above, a space between the adjusting end 51b and the bracket 16 is very large, so that the inclination of the guide shaft 51 has to be adjusted in a large portion. Further, in a case where the surface of the disc D is not perfectly planar, and is slightly warped, the above-described problems appear with increased frequency. As described above, when the optical pickup 30 contacts the lower surface of the disc D due to a large inclination of the guide shaft 51, the lower surface of the disc D is damaged, and the smooth rotation of the disc D is disturbed, resulting in an an error generated by the optical pickup 30 in recording and reproducing data.

Recently, as more compact optical disc players have been manufactured, the height thereof is small enough to allow use of optical disc players in portable computers, such as a notebook computer. Thus, since a space between a disc and a main base must be about 1 mm in a slim optical disc player for a portable computer, the above-described problems are frequently generated in the slim optical disc players.

When the inclination of the guide shaft 51 is adjusted as much as possible, the height H1 of the adjusting screw 61 protrudes above the bracket 16 is at a maximum value. A housing cover 90 is necessarily disposed at a position higher than the protruded height H1 of the adjusting screw 61, to prevent interference with the adjusting screw 61, thereby creating a large space between the housing cover 90 and the main base 10. Conventionally, to create a slim optical disc player and reduce the protruded height H1 of the adjusting screw 61, the diameter of the adjusting end 51b was made smaller than that of the guide shaft 51 shown in FIGS. 2 and 3. For example, if the diameter of the guide shaft 51 is 3 mm, the diameter of the adjusting end 51b is not bigger than 2 mm. Even though the protruded height H1 of the adjusting screw 61 is reduced, this results in an increase in the space between the adjusting end 51b and the bracket 16, and thereby, an increase in the frequency of appearance of the above-described problems.

SUMMARY OF THE INVENTION

The present invention provides a tilt adjusting apparatus for an optical disc player in which an optical pickup does not contact a lower surface of a disc.

According to one aspect of the present invention, there is provided a tilt adjusting apparatus for an optical disc player for adjusting a tilt of an optical pickup so that a light beam emitted from the optical pickup is perpendicularly incident on a recording surface of a disc. The tilt adjusting apparatus has: adjusting ends, respectively positioned on at least first ends of two guide shafts, that are respectively disposed approximately parallel to each other at first and second sides of the optical pickup, to guide reciprocating motion of the optical pickup; elastic members positioned adjacent to the adjusting ends to bias the adjusting ends in a first direction; stoppers respectively positioned above the adjusting ends to limit adjustment of the adjusting ends in the first direction, and having screw coupling holes extending therethrough; and adjusting screws coupled to the screw coupling holes in the stoppers, to adjust the adjusting ends in a second direction opposite the first direction, thereby adjusting the inclination of the guide shafts. The adjusting range in the first direction of the inclinations of the guide shafts is determined by the stoppers, so that the optical pickup does not contact a lower surface of the disc.

Additional aspects and advantages of the invention will be set forth in part in the description which follows and, in part, will be obvious from the description, or may be learned by practice of the invention.

According to one aspect, the adjusting ends have the same diameter as the guide shafts, and the adjusting ends have adjusting screw insertion holes of predetermined depth, into which the adjusting screws are inserted.

According to one aspect, first portions of the adjusting ends have flat cutting surfaces, and the adjusting screw insertion holes are located on the cutting surface.

According to one aspect, first portions of the stoppers engage the cutting surface to limit adjustment of the adjusting ends in the first direction.

According to one aspect, the tilt adjusting apparatus is respectively positioned on not only first ends of the two guide shafts, but also on a second end of one of the two guide shafts.

BRIEF DESCRIPTION OF THE DRAWINGS

These and/or other aspects and advantages of the invention will become apparent and more readily appreciated from the following description of the preferred embodiments, taken in conjunction with the accompanying drawings in which.

DETAILED DESCRIPTION

Figure 1:
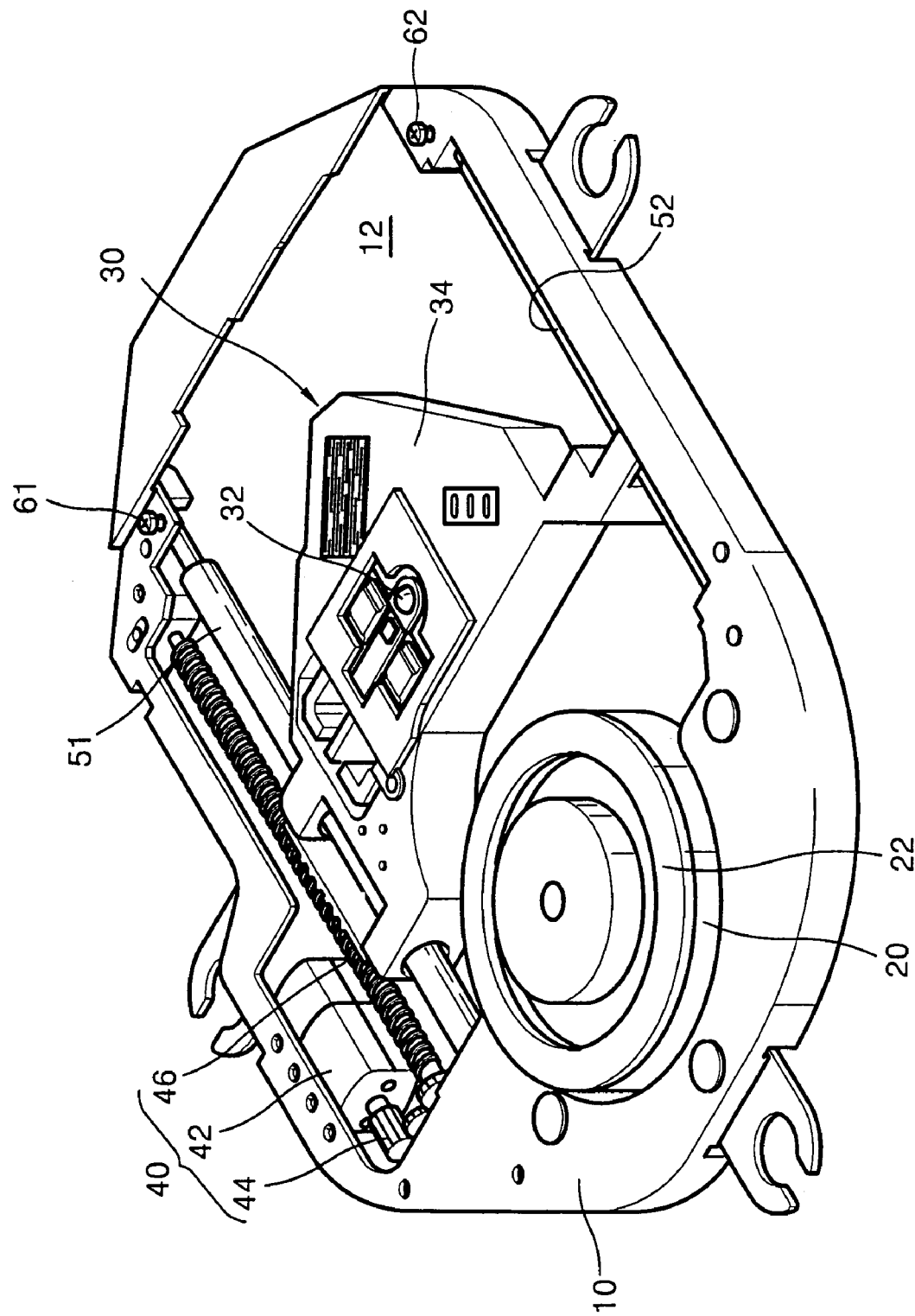
FIG. 1 is a perspective view of a main base of an optical disc player adopting a conventional tilt adjusting apparatus.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
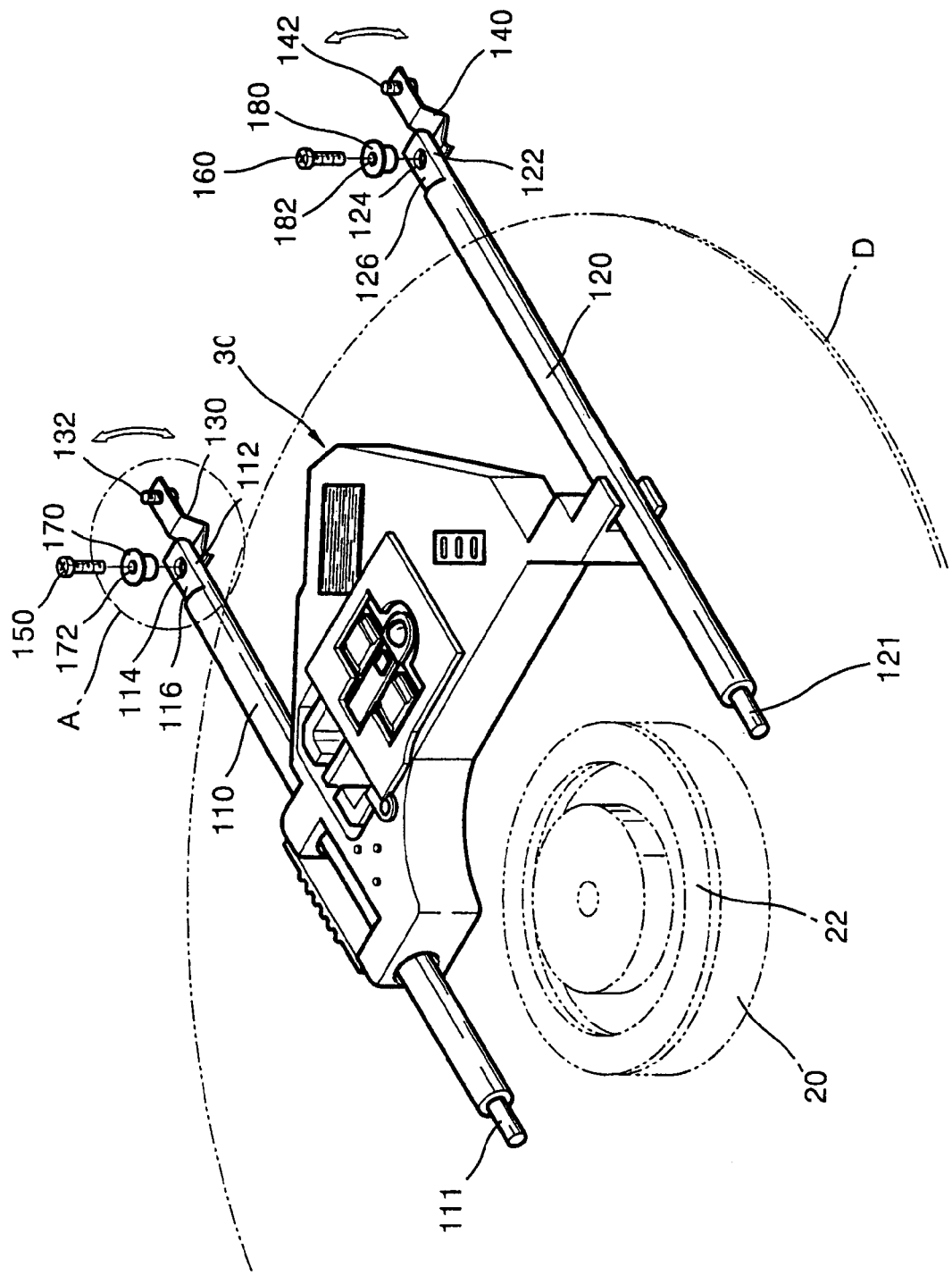
FIG. 4 is a perspective view for explaining a structure and disposition of a tilt adjusting apparatus for an optical disc player according to a first embodiment of the present invention.
Figure 5:
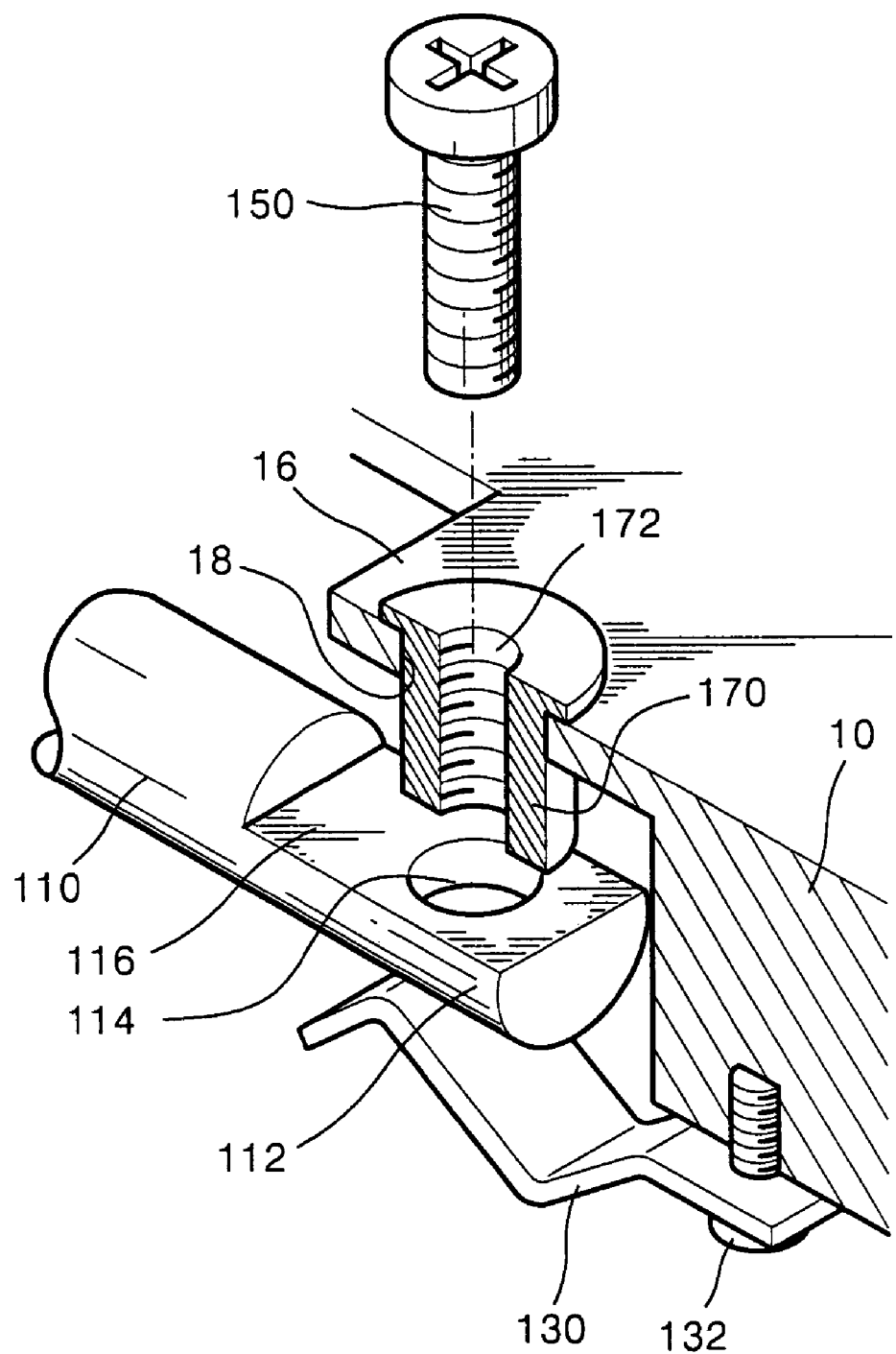
FIG. 5 is an enlarged perspective view of a portion A of FIG. 4.

FIGS. 4 and 5 show a tilt adjusting apparatus for an optical disc player that adjusts a tilt of an optical pickup 30 so that a light beam from the optical pickup 30 is perpendicularly incident on a recording surface of a disc D. The disc D rotates, and is accommodated on a turntable 22 of a spindle motor 20. The tilt adjusting apparatus performing the above function has adjusting ends 112 and 122 of two respective guide shafts 110 and 120, elastic members 130 and 140, stoppers 170 and 180, and adjusting screws 150 and 160. The adjusting ends 112 and 122 are positioned outside the circumference of disc D.

The two guide shafts 110 and 120 are positioned approximately parallel to each other at first and second sides of the optical pickup 30 to guide reciprocating motion of the optical pickup 30. Respective supporting ends 111 and 121 of the guide shafts 110 and 120 are positioned inside the circumference of disc D. The supporting ends 111 and 121 are inserted into and supported by supporting grooves 14 (refer to FIG. 6) located in a main base 10. The adjusting ends 112 and 122 are supported by the adjusting screws 150 and 160 installed thereabove, and the elastic members 130 and 140 installed thereunder.

The elastic members 130 and 140 are disposed under the adjusting ends 112 and 122, and apply an upward elastic force to the adjusting ends 112 and 122. More specifically, first ends of the elastic members 130 and 140 are respectively fixed to a lower surface of the main base 10 by locking screws 132 and 142, and second ends respectively contact lower surfaces of the adjusting ends 112 and 122. Various kinds of springs may be used as the elastic members 130 and 140. According to one aspect, the elastic members 130 and 140 are leaf springs.

The stoppers 170 and 180 are main components of the tilt adjusting apparatus, and are fixed to brackets 16, which are positioned above the adjusting ends 112 and 122. More specifically, through holes 18 are formed in the brackets 16, which are installed at the main base 10, and the stoppers 170 and 180 are inserted into and fixed to the through holes 18. Screw coupling holes 172 and 182 are formed at central portions of the stoppers 170 and 180 and pass through respective tops and bottoms of the stoppers 170 and 180. The adjusting screws 150 and 160 are coupled with the screw coupling holes 172 and 182. Threads for incorporating with the adjusting screws 150 and 160 are located on inner surfaces of the screw coupling holes 172 and 182. According to one aspect, the threads are located along a portion of the inner surface of the screw coupling holes 172 and 182. According to another aspect, the threads are located along the entire inner surface of the screw coupling holes 172 and 182.

Lower portions of the stoppers 170 and 180 extend toward the adjusting ends 112 and 122 with predetermined gaps therebetween when the adjusting ends 112 and 122 are completely lowered. Thus, an amount that the height of the adjusting ends 112 and 122 can be increased is limited by the lower portions of the stoppers 170 and 180. A magnitude of the predetermined gaps between the lower portions of the stoppers 170 and 180 and the completely lowered adjusting ends 112 and 122 is determined so that the optical pickup 30 guided by the guide shafts 110 and 120, does not contact the lower surface of the disc D when inclinations of the guide shafts 110 and 120 are maximized, that is, when the adjusting ends 112 and 122 are completely raised and contact the lower portions of the stoppers 170 and 180. As described above, since the inclinations of the guide shafts 110 and 120 are adjusted properly by the stoppers 170 and 180, the conventional problem that the optical pickup 30 contacts the lower surface of the disc D due to a large inclination of the guide shafts 110 and 120 is avoided.

According to one aspect, the stoppers 170 and 180 are made of a metal material. According to another aspect, to reduce manufacturing costs, the stoppers 170 and 180 are made of injection molded plastic.

The adjusting screws 150 and 160 are coupled with the screw coupling holes 172 and 182 of the stoppers 170 and 180 as described above, and lower portions of the adjusting screws 150 and 160 contact the adjusting ends 112 and 122. Thus, the inclinations of the guide shafts 110 and 120 are respectively changed by adjusting the respective adjusting screws 150 and 160.

Figure 2:
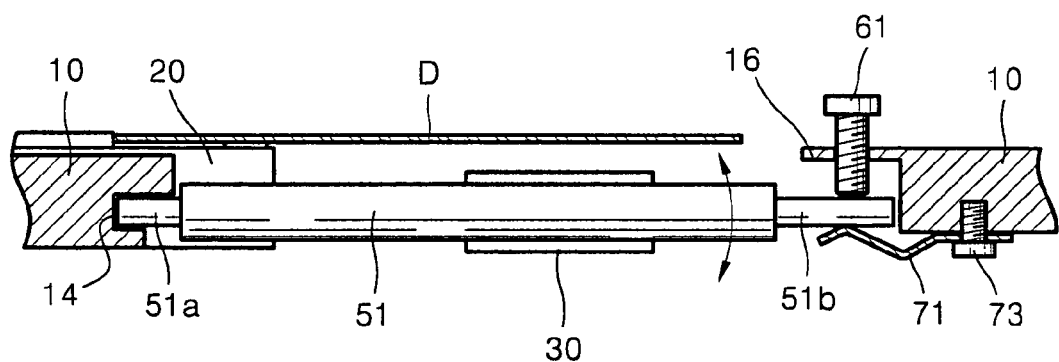
FIG. 2 is a cross-sectional view for explaining a structure incorporating a guide shaft with the tilt adjusting apparatus of FIG. 1.

Conventionally, as shown in FIG. 2, the diameter of the adjusting end 51b is smaller than that of the guide shaft 51. A drawback to this conventional approach, however, is that the concentricity of the guide shaft 51 and the adjusting end 51b must be accurately controlled. That is, if their concentricity is not correct, the inclination of the guide shaft 51 is changed by rotating the guide shaft 51. To solve the above problem, as shown in FIGS. 4 and 5, diameters of the adjusting ends 112 and 122 are the same as the diameters of the guide shafts 110 and 120. Thus, since the conventional problem due to the concentricity difference is avoided, the concentricity of the guide shafts 110 and 120 and the respective adjusting ends 112 and 122 need not be separately addressed in manufacturing.

Figure 3:
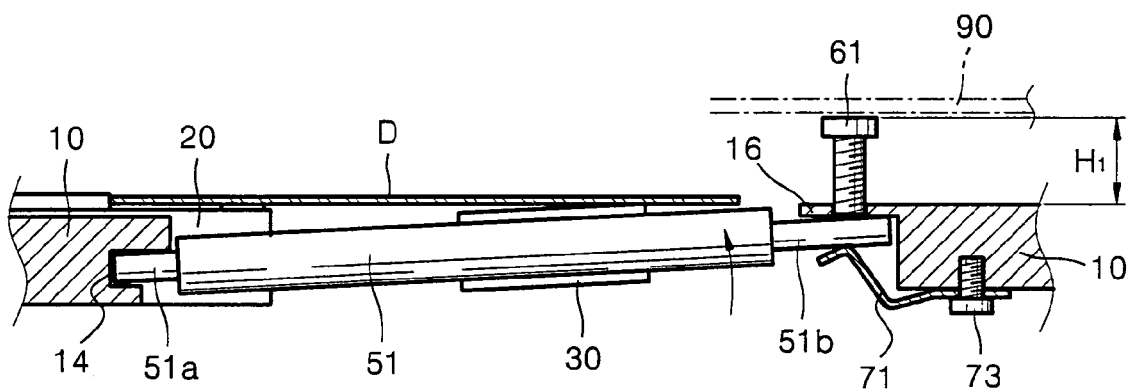
FIG. 3 is a view for explaining problems of the conventional tilt adjusting apparatus generated when the guide shaft of FIG. 2 is adjusted too much.

Further, according to one aspect, adjusting screw insertion holes 114 and 124 having a predetermined depth are located on upper portions of the adjusting ends 112 and 122 to insert the adjusting screws 150 and 160. Since the adjusting screws 150 and 160 having a predetermined length are inserted into the adjusting screw insertion holes 114 and 124 having the predetermined depth, the protruded height H2 (refer to FIG. 7) of the adjusting screws 150 and 160 is reduced compared to conventional devices (refer to FIG. 3) so that a slim optical disc player is achieved. Thus, it is preferable that the depth of the adjusting screw insertion holes 114 and 124 is as great as possible, while still maintaining a predetermined strength of the adjusting ends 112 and 122. According to one aspect, the adjusting screw insertion holes 114 and 124 extend below the center line of the guide shafts 110 and 120. Further, since the adjusting screws 150 and 160 are inserted into adjusting screw insertion holes 114 and 124, the guide shafts 110 and 120 are prevented from rotating during the translation of the optical pickup 30.

According to one aspect, adjusting screw insertion holes 114 and 124 have a diameter large enough to insert the adjusting screws 150 and 160 freely. According to another aspect, the adjusting screw insertion holes 114 and 124 have a diameter large enough so that the adjusting screws 150 and 160 do not contact the inner surface of the adjusting screw insertion holes 114 and 124 when the guide shafts 110 and 120 are completely raised.

According to one aspect, the upper portions of the adjusting ends 112 and 122 have flat cutting surfaces 116 and 126. According to another aspect, the cutting surfaces 116 and 126 are created by cutting and removing the upper portions of the adjusting ends 112 and 122 to a predetermined depth. According to yet another aspect, the lower portions of the stoppers 170 and 180 are positioned on the cutting surfaces 116 and 126. That is, the above-described predetermined gaps are formed between the lower portions of the stoppers 170 and 180 and the cutting surfaces 116 and 126. Since the adjusting screw insertion holes 114 and 124 are located on the flat cutting surfaces 116 and 126 and have a predetermined depth, after the cutting surfaces 116 and 126 are formed on the upper portions of the adjusting ends 112 and 122, the adjusting screw insertion holes 114 and 124 are easily created. Further, when the adjusting ends 112 and 122 are completely raised, the cutting surfaces 116 and 126 contact the stoppers 170 and 180.

Figure 7:
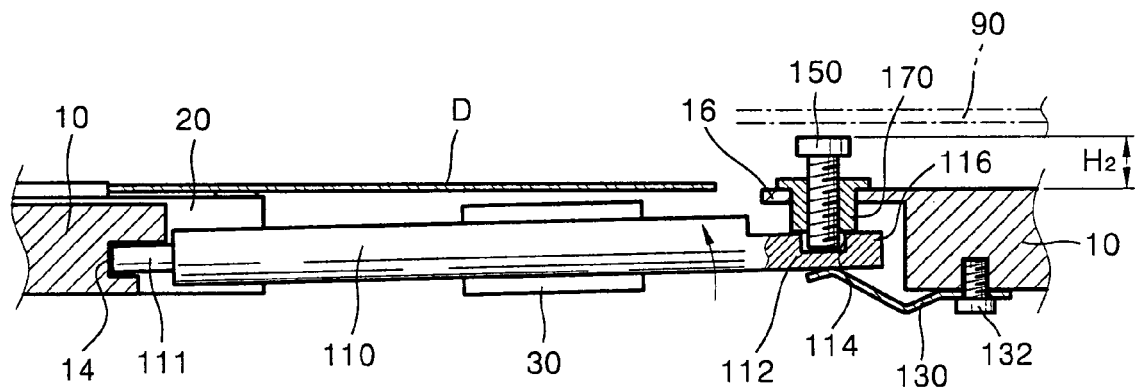
Figure 8:
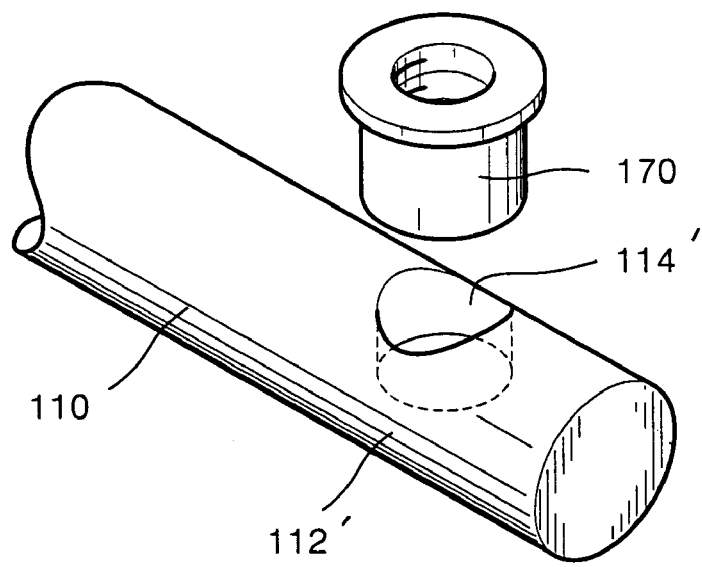
FIG. 8 is a perspective view showing another example of an adjusting end of the guide shaft of FIG. 5.

According to another aspect, as shown in FIG. 8, an adjusting screw insertion hole 114' having a predetermined depth is formed in an adjusting end 112' that does not have a cutting surface. According to this aspect, the protruded height H2 (refer to FIG. 7) of the adjusting screw 150 is reduced, and the guide shaft 110 is prevented from rotating. It is, however, somewhat difficult to manufacture the adjusting screw insertion hole 114' on a curved upper surface of the adjusting end 112'.

Figure 9:
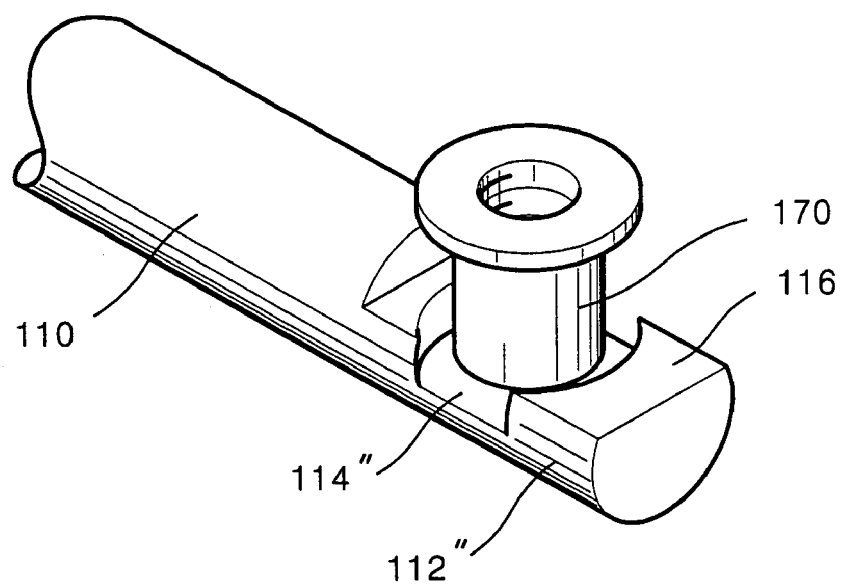
FIGS. 9 and 10 are a perspective view and a cross-sectional view showing another example of the adjusting end of the guide shaft of FIG. 5.
Figure 10:
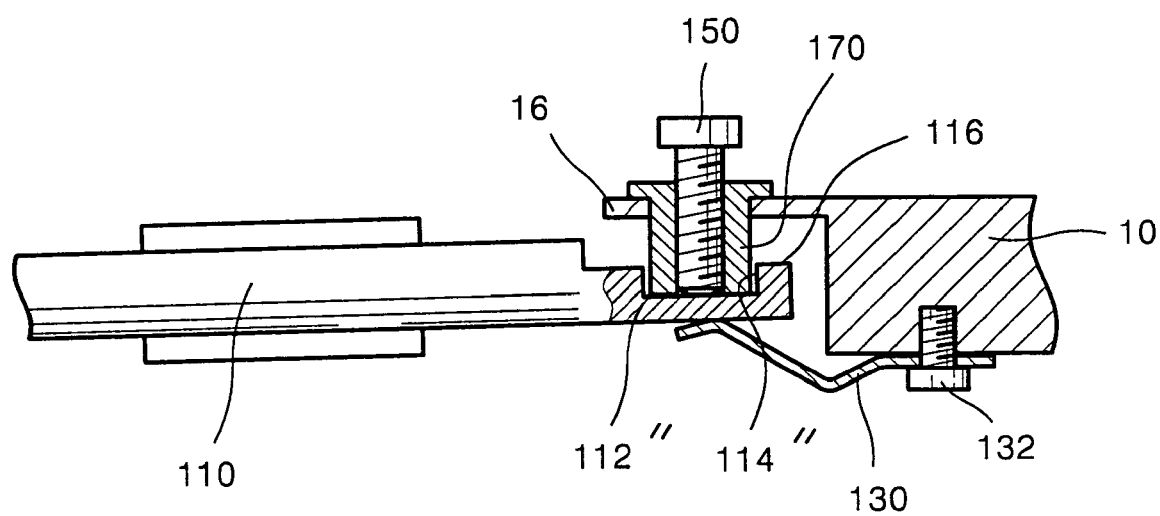

According to another aspect, as shown in FIGS. 9 and 10, an adjustment screw insertion hole 114" has a diameter sufficiently large that the lower portion of the stopper 170 can be inserted into the adjusting screw insertion hole 114" to a predetermined depth. When an adjusting end 112" is completely lowered, a gap is measured between the lower portion of the stopper 170 and an upper surface of the adjusting screw insertion hole 114". The upper surface of the adjusting screw insertion hole 114" contacts the lower portion of the stopper 170 to establish the maximum inclination of the guide shaft 110. Thus, the protruded height H2 (refer to FIG. 7) of the adjusting screw 150 is reduced, and the guide shaft 110 is prevented from rotating. But the diameter of adjusting screw insertion hole 114" must be sufficiently large that the stopper 170 does not contact the inner surface of the adjusting screw insertion hole 114" when the guide shaft 110 is maximally inclined. Further, according to this aspect, the diameter of the adjusting screw insertion hole 114" does not become so large that the strength of the adjusting end 112" of the guide shaft 110 is compromised.

The operation of the tilt adjusting apparatus having the above-described structure will be described referring to FIGS. 6 and 7, which are cross-sectional views of a structure incorporating the guide shaft in the tilt adjusting apparatus of FIG. 5.

Figure 6:
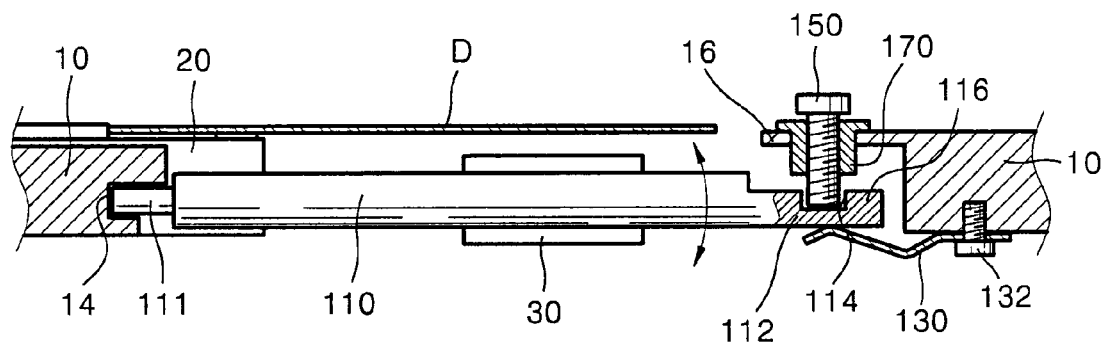
FIGS. 6 and 7 are cross-sectional views for explaining a structure incorporating a guide shaft with a tilt adjusting apparatus of FIG. 5 and operation thereof.

Referring to FIG. 6, the supporting end 111 of the guide shaft 110 is fitted to the supporting groove 14 of the main base 10 to not move up and down, and functions as a hinge point when the adjusting end 112 moves up and down. The up-and-down movement of the adjusting end 112 is carried out by the adjusting screw 150, which is coupled with the stopper 170 that is fixed to the bracket 16 of the main base 10, and the elastic member 130, that has one end fixed to the lower surface of the main base 10 by the locking screw 132.

When the adjusting screw 150 is tightened, the lower portion of the adjusting screw 150 presses the bottom surface of the adjusting screw insertion hole 114, so that the adjusting end 112 of the guide shaft 110 moves downward against the upward elastic force of the elastic member 130. Thus, the guide shaft 110 pivots in a clockwise direction by a predetermined angle using the supporting end 111 as a hinge point. In contrast, when the adjusting screw 150 is loosened, the adjusting end 112 is moved upward by the upward elastic force of the elastic member 130. Thus, the guide shaft 110 pivots in a counterclockwise direction by a predetermined angle, whereby the inclination of the guide shaft 110 is adjusted.

Referring to FIG. 7, when the adjusting end 112 rises by a predetermined height, the upper surface of the adjusting end 112, that is, the cutting surface 116, contacts the lower portion of the stopper 170 so that the adjusting end 112 is maximally raised, and the guide shaft 110 is maximally inclined. Thus, the conventional problem that the optical pickup 30 contacts the lower surface of the disc D due to a large inclination of the guide shaft 110 is avoided.

When the inclination of the guide shaft 110 is maximized, a height H2 of the adjusting screw 150 protruded above the bracket 16 is at maximum value. Since the lower portion of the adjusting screw 150 is inserted into the adjusting screw insertion hole 114, the protruded height H2 of the adjusting screw 150 is much smaller the protruded height H1 (see FIG. 3) of a conventional tilt adjusting apparatus. Thus, the space between the main base 10 and the housing cover 90 is reduced, and a slim optical disc player is achieved.

In the tilt adjusting apparatus according to the present invention, since the inclination of the guide shaft 110 is limited by the stopper 170, the conventional problem that the optical pickup 30 contacts the lower surface of the disc D due to a large inclination of the guide shaft 110 is solved. Further, since the height of the optical disc player can be reduced compared to the convention optical disc player, a compact optical disc player can be designed and manufactured. Particularly, a very slim optical disc player can be installed in a portable computer such as a notebook computer.

Figure 11:
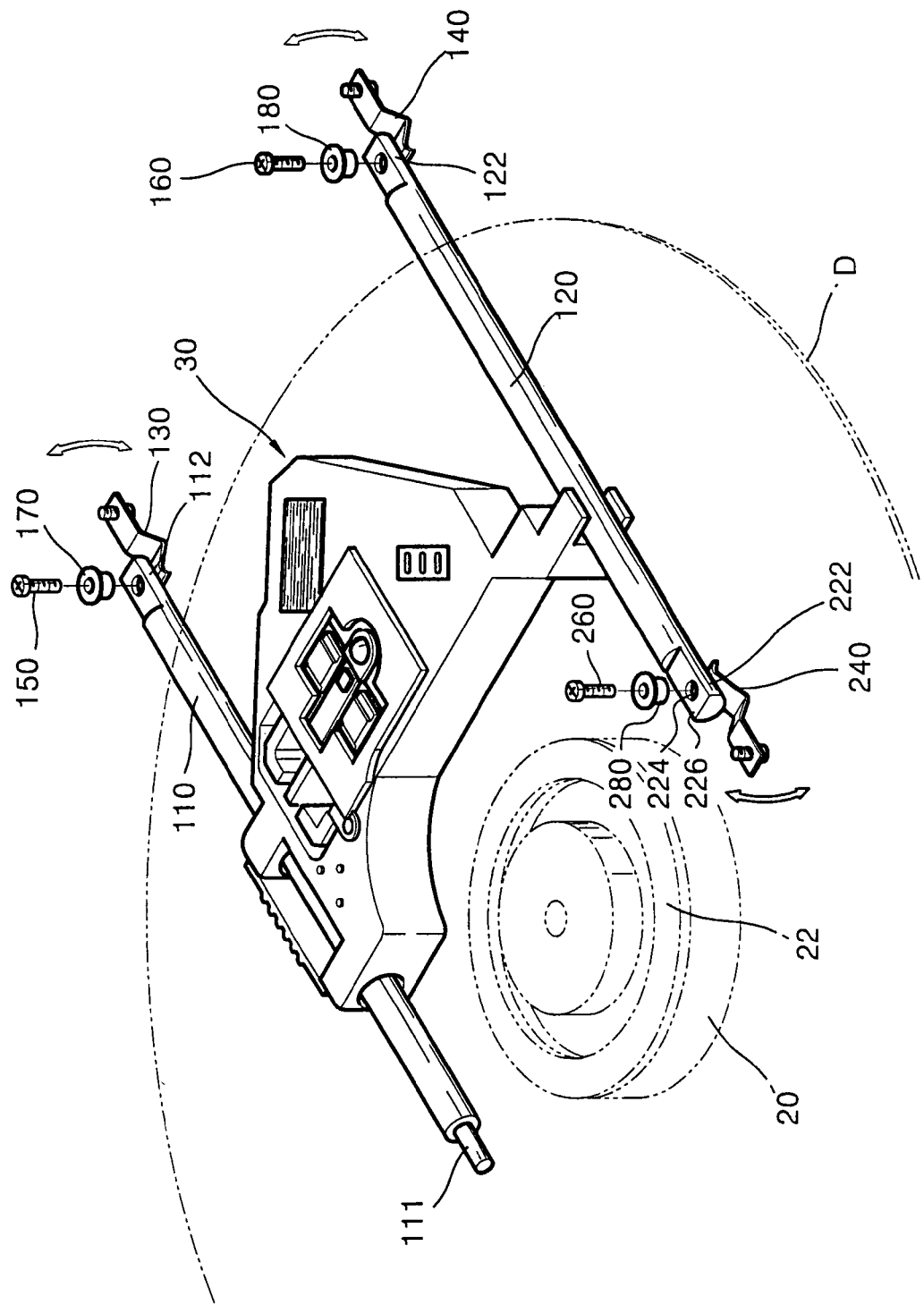
FIG. 11 is a perspective view showing a structure and disposition of a tilt adjusting apparatus to perform a three-point tilt adjustment according to another embodiment of the present invention.

FIG. 11 is a perspective view showing a structure and disposition of a tilt adjusting apparatus that performs a three-point tilt adjustment according to another embodiment of the present invention.

Conventionally, the tilt adjusting apparatus cannot be installed inside the circumference of the disc D due to the interference between the disc D and the adjusting screw, and thus tilt adjusting apparatuses are positioned outside the circumference of the disc D. That is, a two-point tilt adjustment method is used.

As shown in FIG. 11, since a protruded height of an adjusting screw 260 can be reduced in the present embodiment, adjusting assemblies of the tilt adjusting apparatus can be positioned not only outside the circumference of the disc D, but also on an end 222 of a guide shaft 120 installed inside the circumference of the disc D. According to one aspect, the tilt adjusting apparatus has a third adjustment assembly installed inside the circumference of the disc D, positioned on one of two guide shafts 110 and 120 installed on opposing sides of the optical pickup 30. For convenience, the guide shaft 120 is selected for the remainder of this discussion.

The third adjusting assembly has the same components as the adjusting assemblies installed outside the area of the disc D. That is, the adjusting end 222 is provided with a cutting surface 226 and an adjusting screw insertion hole 224, an elastic member 240, an adjusting screw 260, and a stopper 280. Thus, a three-point tilt adjustment is possible, and therefore, the tilt of an optical pickup using the tilt adjusting apparatus of the present invention can be adjusted more precisely.

As described above, the tilt adjusting apparatus according to the present invention has the following advantages.

First, since the inclination of the guide shaft is limited by the stopper, the conventional problem that the optical pickup contacts the lower surface of the disc due to a large inclination of the guide shaft is solved.

Second, the adjusting screw insertion hole is formed in the adjusting end of the guide shaft, so that the height that the adjusting screw protrudes above the main base is reduced. Further, an adjusting assembly can be positioned on the end of the guide shaft installed inside the circumference of the disc so that a three-point tilt adjustment is possible.

Third, since the guide shaft and the adjusting end have the same diameter, the concentricity of the guide shaft and the adjusting end need not be addressed separately in manufacturing the guide shaft.

Fourth, since the adjusting screw is inserted into the adjusting screw insertion hole formed on the adjusting end, the guide shaft is prevented from rotating, enabling more stable tilt adjustment.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A tilt adjusting apparatus for an optical disc player to adjust a tilt of an optical pickup so that a light beam emitted from the optical pickup is perpendicularly incident on a recording surface of a disc, the tilt adjusting apparatus comprising:
- adjusting ends positioned on at least first ends of two guide shafts that are respectively disposed approximately parallel to each other at first and second sides of the optical pickup to guide reciprocating motion of the optical pickup; and
- for each adjusting end, the tilt adjusting apparatus further comprises
  - an elastic member positioned adjacent to the adjusting end, contacting a first location of the adjusting end, and applying an elastic force to the adjusting end in a first direction,
  - a stopper opposing a second location of the adjusting end opposite the first location, having a screw coupling hole therein passing through first and second portions of the stopper, the second portion of the stopper limiting adjustment of the adjusting end in the first direction when the adjusting end engages the second portion of the stopper, so that the optical pickup does not contact a lower surface of the disc, and
  - an adjusting screw coupled to the screw coupling hole in the stopper, a first portion of the adjusting screw contacting the adjusting end and adjusting the adjusting end in a second direction opposite the first direction when the adjusting screw is rotated in a first rotational direction, and thereby adjusting the inclination of the respective guide shaft.

2. The tilt adjusting apparatus of claim 1, wherein:
the adjusting end has the same diameter as the respective guide shaft; and
the adjusting end comprises an adjusting screw insertion hole of predetermined depth located on the second location of the adjusting end, into which the first portion of the adjusting screw is inserted.

3. The tilt adjusting apparatus of claim 2, wherein:
the second location of the adjusting end has a flat cutting surface; and
the adjusting screw insertion holes are located on the cutting surface.

4. The tilt adjusting apparatus of claim 3, wherein the the second portion of the stopper engages the cutting surface to limit the adjustment of the adjusting end in the first direction.

5. The tilt adjusting apparatus of claim 4, wherein:
a diameter of the adjusting screw is sufficiently small compared to a diameter of the adjusting screw insertion hole that the adjusting screw does not contact an inner side surface of the adjusting screw insertion hole when the adjusting end is maximally adjusted in the first direction.

6. The tilt adjusting apparatus of claim 2, wherein the the second portion of the stopper is inserted into the adjusting screw insertion hole to a predetermined depth to limit the adjustment of the adjusting end in the first direction.

7. The tilt adjusting apparatus of claim 6, wherein:
an external diameter of the stopper is sufficiently small compared to a diameter of the adjusting screw insertion hole that the stopper does not contact an inner side surface of the adjusting screw insertion hole when the adjusting end is maximally adjusted in the first direction.

8. The tilt adjusting apparatus of claim 2, wherein:
the predetermined depth of the adjusting screw insertion hole is greater than a radius of the guide shaft.

9. The tilt adjusting apparatus of claim 2, further comprising:
an additional adjusting end positioned on a second end of one of the two guide shafts.

10. The tilt adjusting apparatus of claim 1, wherein the stopper is made of plastic.

11. The tilt adjusting apparatus of claim 1, wherein the elastic member is a leaf spring.

12. A tilt adjusting apparatus for an optical disk player including a base, an optical pickup, and a first guide shaft to guide reciprocating motion of the optical pickup, the tilt adjusting apparatus, which adjusts a tilt of the optical pickup so that a light beam emitted from the optical pickup is perpendicularly incident on a recording surface of a disc, comprising:
- an adjusting end positioned at a first end of the first guide shaft;
- an elastic member, combined to the base and elastically biasing the adjusting end in a first direction;
- a stopper combined to the base adjacent to the adjusting end, having a screw coupling hole, and limiting adjustment of the adjusting end in the first direction when the adjusting end engages a first end of the stopper, so that the optical pickup does not contact a second surface of the disc; and
- an adjusting screw, coupled to the screw coupling hole, and contacting the adjusting end, to adjust the adjusting end in a second direction opposite the first direction when the adjusting screw is rotated in a first rotational direction.

13. The tilt adjusting apparatus of claim 12, wherein the screw coupling hole of the stopper comprises:
threads to engage the coupling screw located on a portion of an inner surface of the screw coupling hole.

14. The tilt adjusting apparatus of claim 12, wherein the screw coupling hole of the stopper comprises:
threads to engage the coupling screw located along an entire inner surface of the screw coupling hole.

15. The tilt adjusting apparatus of claim 12, wherein:
the stopper is made of metal.

16. The tilt adjusting apparatus of claim 12, wherein:
the stopper is made of plastic.

17. The tilt adjusting apparatus of claim 12, wherein:
the adjusting end has the same diameter as the respective guide shaft.

18. The tilt adjusting apparatus of claim 17, wherein the adjusting end comprises:
a cutting surface,
wherein the adjusting screw contacts the adjusting end at the cutting surface, to adjust the adjusting end in the second direction.

19. The tilt adjusting apparatus of claim 18, wherein:
the first end of the stopper limits the adjustment of the adjusting end in the first direction when the cutting surface engages the first end of the stopper.

20. The tilt adjusting apparatus of claim 12, wherein:
the adjusting end has an adjusting screw insertion hole with an end surface,
wherein the adjusting screw is inserted into the adjusting screw insertion hole, and the adjusting screw contacts the adjusting end at the end surface of the adjusting screw insertion hole, to adjust the adjusting end in the second direction.

21. The tilt adjusting apparatus of claim 20, wherein:
a predetermined depth of the adjusting screw insertion hole is greater than a radius of the guide shaft.

22. The tilt adjusting apparatus of claim 20, wherein:
when the adjusting screw is inserted into the adjusting screw insertion hole, the guide shaft is prevented from rotating.

23. The tilt adjusting apparatus of claim 20, wherein:
a diameter of the adjusting screw insertion hole is sufficiently large that the first end of the stopper contacts the end surface of the adjusting screw insertion hole to limit adjustment of the adjusting end in the first direction.

24. The tilt adjusting apparatus of claim 20, wherein the adjusting end comprises:
a flat cutting surface,
wherein
the adjusting screw insertion hole is located on the cutting surface,
the adjusting screw is inserted into the adjusting screw insertion hole, and
the adjusting screw contacts the adjusting end at the end surface of the adjusting screw insertion hole, to adjust the adjusting end in the second direction.

25. The tilt adjusting apparatus of claim 24, wherein:
the flat cutting surface is created by cutting and removing a first portion of the adjusting end.

26. The tilt adjusting apparatus of claim 24, wherein:
the first end of the stopper limits the adjustment of the adjusting end in the first direction when the cutting surface engages the first end of the stopper.

27. The tilt adjusting apparatus of claim 26, wherein:
a diameter of the adjusting screw is sufficiently small compared to a diameter of the adjusting screw insertion hole that the adjusting screw does not contact a side surface of the adjusting screw insertion hole when the adjusting end is maximally adjusted in the first direction.

28. The tilt adjusting apparatus of claim 24, wherein:
the first end of the stopper is inserted into the adjusting screw insertion hole; and
the first end of the stopper limits the adjustment of the adjusting end in the first direction when the end surface of the adjusting screw insertion hole engages the first end of the stopper.

29. The tilt adjusting apparatus of claim 28, wherein:
an external diameter of the stopper is sufficiently small compared to a diameter of the adjusting screw insertion hole that the adjusting screw does not contact a side surface of the adjusting screw insertion hole when the adjusting end is maximally adjusted in the first direction.

30. The tilt adjusting apparatus of claim 12, wherein:
the optical disk player further comprises a second guide shaft;
the first and second guide shafts are positioned approximately parallel to each other on first and second sides of the optical pickup;
adjusting ends are positioned respectively at the first end of the first guide shaft, and a first end of the second guide shaft; and for each adjusting end, the tilt adjusting apparatus further comprises
an elastic member, combined to the base and elastically biasing the adjusting end in a first direction,
a stopper combined to the base adjacent to the adjusting end, having a screw coupling hole, and limiting adjustment of the adjusting end in the first direction when the adjustment end engages a first end of the stopper, so that the optical pickup does not contact a second surface of the disc, and
an adjusting screw, coupled to the screw coupling hole, and contacting the adjustment end, to adjust the adjusting end in a second direction opposite the first direction when the adjusting screw is rotated in a first rotational direction.

31. The tilt adjusting apparatus of claim 30, wherein:
the adjusting ends are positioned outside a circumference of the disc.

32. The tilt adjusting apparatus of claim 30, wherein:
an additional adjusting end is positioned inside a circumference of the disc.

33. The tilt adjusting apparatus of claim 30, wherein:
the adjusting ends are positioned outside a circumference of the disc; and
an additional adjusting end is positioned inside a circumference of the disc.

34. The tilt adjusting apparatus of claim 33, wherein:
the additional adjusting end is positioned at a second end of the first guide shaft.

35. A tilt adjusting apparatus for an optical disk player including a base, an optical pickup, and a guide shaft to guide reciprocating motion of the optical pickup, the tilt adjusting apparatus, which adjusts a tilt of the optical pickup so that a light beam emitted from the optical pickup is perpendicularly incident on a recording surface of a disc, comprising:
an adjusting end positioned at a first end of the guide shaft;
an elastic member, combined to the base and elastically biasing the adjusting end in a first direction;
a stopper combined to the base adjacent to the adjusting end, having a screw coupling hole; and
an adjusting screw, coupled to the screw coupling hole, wherein
when the adjusting screw rotates in a first rotational direction, a first end of the adjusting screw contacts the adjusting end and moves the adjusting end in a second direction opposite the first direction, and
when the adjusting screw rotates in a second rotational direction opposite the first rotational direction, the bias of the elastic member moves the adjusting end in the first direction until the adjusting end contacts the stopper.

* * * * *

UNITED STATES PATENT AND TRADEMARK OFFICE
CERTIFICATE OF CORRECTION

PATENT NO.         : 7,213,251 B2                                         Page 1 of 1
APPLICATION NO. : 10/609573
DATED              : May 1, 2007
INVENTOR(S)        : Chan-bum Park et al.

It is certified that error appears in the above-identified patent and that said Letters Patent is hereby corrected as shown below:

Column 9, Line 43-44, before "second" delete "the".

Column 9, Line 54-55, before "second" delete "the".

Signed and Sealed this

Fourteenth Day of August, 2007

JON W. DUDAS
*Director of the United States Patent and Trademark Office*